(12) United States Patent
Laaser et al.

(10) Patent No.: US 10,740,853 B1
(45) Date of Patent: Aug. 11, 2020

(54) SYSTEMS FOR ALLOCATING RESOURCES BASED ON ELECTRONIC TAX RETURN PREPARATION PROGRAM USER CHARACTERISTICS

(71) Applicant: Intuit Inc., Mountain View, CA (US)

(72) Inventors: William T. Laaser, Palo Alto, CA (US); Jonathan Goldman, Mountain View, CA (US); Massimo Mascaro, San Diego, CA (US); Luis F. Cabrera, Bellevue, WA (US)

(73) Assignee: INTUIT INC., Mountain View, CA (US)

( * ) Notice: Subject to any disclaimer, the term of this patent is extended or adjusted under 35 U.S.C. 154(b) by 462 days.

(21) Appl. No.: 14/698,683

(22) Filed: Apr. 28, 2015

(51) Int. Cl.
*G06Q 40/00* (2012.01)
*G06Q 30/02* (2012.01)

(52) U.S. Cl.
CPC ....... *G06Q 40/123* (2013.12); *G06Q 30/0269* (2013.01)

(58) Field of Classification Search
None
See application file for complete search history.

(56) References Cited

U.S. PATENT DOCUMENTS

| | | | |
|---|---|---|---|
| 4,209,839 A | 6/1980 | Bedermen | |
| 5,485,544 A * | 1/1996 | Nonaka | G06F 9/4446 706/11 |
| 5,500,920 A | 3/1996 | Kupiec | |
| 5,819,288 A | 10/1998 | De Bonet | |
| 5,864,482 A | 1/1999 | Hazama | |
| 5,884,283 A | 3/1999 | Manos | |
| 5,944,784 A | 8/1999 | Simonoff | |
| 6,021,397 A | 2/2000 | Jones et al. | |
| 6,311,166 B1 | 10/2001 | Nado et al. | |
| 6,401,080 B1 | 6/2002 | Bigus et al. | |
| 6,473,741 B1 | 10/2002 | Baker | |
| 6,691,116 B1 | 2/2004 | Bart | |
| 6,718,336 B1 | 4/2004 | Saffer | |

(Continued)

FOREIGN PATENT DOCUMENTS

| | | |
|---|---|---|
| JP | 2002-099613 | 4/2002 |
| KR | 10-2009-0089225 | 8/2009 |

(Continued)

OTHER PUBLICATIONS

U.S. Appl. No. 15/363,681, filed Nov. 29, 2016 (Nov. 6, 2020 to Feb. 6, 2020).

(Continued)

*Primary Examiner* — Christopher Bridges
(74) *Attorney, Agent, or Firm* — DLA Piper LLP (US)

(57) ABSTRACT

A computer analytic system for allocating resources of an electronic tax return preparation system, the system includes an information module configured to collect taxpayer data of a user, the taxpayer data including an indicator of an increased likelihood that the user will abandon the electronic tax return preparation program. The system also includes a memory module configured to store the collected taxpayer data. The system further includes a retention module configured to analyze the collected taxpayer data and generate a resource allocation recommendation based on the collected taxpayer data.

23 Claims, 10 Drawing Sheets

(56) References Cited

U.S. PATENT DOCUMENTS

| | | |
|---|---|---|
| 7,010,507 B1 | 3/2006 | Anderson et al. |
| 7,047,251 B2 | 5/2006 | Reed |
| 7,149,970 B1 | 12/2006 | Pratley et al. |
| 7,181,438 B1 | 2/2007 | Szabo |
| 7,254,554 B2 | 8/2007 | Tawara et al. |
| 7,289,956 B2 | 10/2007 | Yu et al. |
| 7,461,059 B2 | 12/2008 | Richardson et al. |
| 7,539,635 B1 | 5/2009 | Peak et al. |
| 7,565,312 B1 | 7/2009 | Shaw et al. |
| 7,584,093 B2 | 9/2009 | Potter et al. |
| 7,590,572 B2 | 9/2009 | Larson |
| 7,603,301 B1 | 10/2009 | Regan |
| 7,610,226 B1 | 10/2009 | Miller |
| 7,636,742 B1 | 12/2009 | Olavarrieta et al. |
| 7,668,763 B1 | 2/2010 | Albrecht |
| 7,680,756 B2 | 3/2010 | Quinn |
| 7,685,034 B1 | 3/2010 | Mori et al. |
| 7,685,082 B1 | 3/2010 | Coletta et al. |
| 7,693,769 B1 | 4/2010 | Burlison et al. |
| 7,712,023 B1 | 5/2010 | Bryan |
| 7,716,094 B1 | 5/2010 | Sutter |
| 7,716,099 B1 | 5/2010 | Welch et al. |
| 7,742,958 B1 | 6/2010 | Leek et al. |
| 7,747,484 B2 | 6/2010 | Stanley et al. |
| 7,756,761 B1 | 7/2010 | Albrecht |
| 7,756,855 B2 | 7/2010 | Ismalon |
| 7,769,647 B1 | 8/2010 | Char et al. |
| 7,778,895 B1 | 8/2010 | Baxter et al. |
| 7,788,195 B1 | 8/2010 | Subrannanian |
| 7,805,343 B1 | 9/2010 | Lyons et al. |
| 7,818,222 B2 | 10/2010 | Allanson et al. |
| 7,836,406 B1 | 11/2010 | Kirsten et al. |
| 7,848,971 B1 | 12/2010 | Mori et al. |
| 7,853,494 B2 | 12/2010 | Wyle |
| 7,860,763 B1 | 12/2010 | Quinn et al. |
| 7,860,774 B1 | 12/2010 | Peterson et al. |
| 7,870,491 B1 * | 1/2011 | Henderson .............. G06F 9/453 715/745 |
| 7,890,442 B2 | 2/2011 | Weir et al. |
| 7,904,356 B1 | 3/2011 | Cobarrubia |
| 7,912,767 B1 | 3/2011 | Cheatham et al. |
| 7,917,411 B1 | 3/2011 | Bedell |
| 7,917,412 B1 | 3/2011 | Wang |
| 7,930,226 B1 | 4/2011 | Quinn et al. |
| 7,984,004 B2 | 7/2011 | Andrew et al. |
| 8,001,006 B1 | 8/2011 | Yu et al. |
| 8,014,308 B2 * | 9/2011 | Gates, III ................ H04L 12/66 370/252 |
| 8,019,664 B1 | 9/2011 | Tifford et al. |
| 8,024,660 B1 * | 9/2011 | Quinn ..................... G06F 9/453 715/745 |
| 8,050,988 B2 | 11/2011 | Kershner et al. |
| 8,095,476 B2 | 1/2012 | Bierner et al. |
| 8,099,329 B2 | 1/2012 | Paulsen |
| 8,108,258 B1 * | 1/2012 | Slattery ................ G06Q 20/207 705/19 |
| 8,126,716 B2 | 2/2012 | Dhanakshirur |
| 8,126,787 B1 | 2/2012 | Leek et al. |
| 8,190,499 B1 | 5/2012 | McVickar |
| 8,204,805 B2 | 6/2012 | Eftekhari et al. |
| 8,326,754 B2 | 12/2012 | Bandych |
| 8,346,635 B1 | 1/2013 | Olim |
| 8,355,966 B1 | 1/2013 | Vu et al. |
| 8,407,113 B1 | 3/2013 | Eftekhari et al. |
| 8,417,596 B1 | 4/2013 | Dunbar et al. |
| 8,417,715 B1 | 4/2013 | Bruckhaus et al. |
| 8,418,920 B2 | 4/2013 | Lieberman et al. |
| 8,423,444 B1 | 4/2013 | MacKrell et al. |
| 8,429,184 B2 | 4/2013 | Ismon |
| 8,433,627 B2 | 4/2013 | Agee et al. |
| 8,447,667 B1 | 5/2013 | Dinamani et al. |
| 8,452,676 B1 | 5/2013 | Tan et al. |
| 8,468,110 B1 * | 6/2013 | Podgorny ............... G06F 9/4446 706/45 |
| 8,504,582 B2 | 8/2013 | Soetarman |
| 8,527,375 B1 | 9/2013 | Olim |
| 8,583,517 B1 | 11/2013 | Ohme |
| 8,589,262 B1 | 11/2013 | Wang |
| 8,606,665 B1 | 12/2013 | Shaw |
| 8,635,127 B1 | 1/2014 | Shaw |
| 8,656,273 B1 | 2/2014 | Tifford et al. |
| 8,689,262 B2 | 4/2014 | Yamamura |
| 8,694,397 B2 | 4/2014 | Seubert et al. |
| 8,719,120 B1 | 5/2014 | McVickar et al. |
| 8,812,380 B2 | 8/2014 | Murray et al. |
| 8,857,713 B2 | 10/2014 | Lieberman et al. |
| 8,874,731 B1 | 10/2014 | Puppin |
| 8,903,810 B2 | 12/2014 | Ismon |
| 8,942,999 B1 | 1/2015 | Fernando et al. |
| 9,037,962 B1 | 5/2015 | Vassar et al. |
| 9,069,869 B1 | 6/2015 | Quinn et al. |
| 9,098,586 B1 | 8/2015 | Latif |
| 9,117,247 B2 | 8/2015 | Lieberman et al. |
| 9,153,141 B1 | 10/2015 | Kane, Jr. |
| 9,201,558 B1 | 12/2015 | Dingman |
| 9,280,252 B1 | 3/2016 | Brandmer et al. |
| 9,286,282 B2 | 3/2016 | Ling, III |
| 9,390,402 B1 | 7/2016 | Kane, Jr. |
| 9,406,089 B2 | 8/2016 | Mori et al. |
| 9,412,017 B1 | 8/2016 | Huang et al. |
| 9,444,824 B1 | 9/2016 | Bazs et al. |
| 9,690,854 B2 | 6/2017 | Stent |
| 9,734,136 B1 | 8/2017 | Mody et al. |
| 9,779,129 B1 | 10/2017 | Lequeux |
| 9,786,017 B1 | 10/2017 | Ohme et al. |
| 9,787,597 B1 | 10/2017 | Miller et al. |
| 2002/0002546 A1 | 1/2002 | Doerr et al. |
| 2002/0015056 A1 * | 2/2002 | Weinlaender ........... G06F 9/453 715/705 |
| 2002/0052774 A1 | 5/2002 | Parker et al. |
| 2002/0093529 A1 * | 7/2002 | Daoud .............. G06F 17/30867 715/745 |
| 2002/0111888 A1 | 8/2002 | Stanley et al. |
| 2002/0111890 A1 | 8/2002 | Sloan et al. |
| 2003/0050876 A1 | 3/2003 | Tawara et al. |
| 2003/0069882 A1 | 4/2003 | Nieswand et al. |
| 2003/0115259 A1 | 6/2003 | Narayanan |
| 2004/0078271 A1 | 4/2004 | Morano et al. |
| 2004/0254927 A1 | 12/2004 | Lang et al. |
| 2005/0027632 A1 | 2/2005 | Zeitoun et al. |
| 2005/0038722 A1 | 2/2005 | Throndson et al. |
| 2005/0043998 A1 | 2/2005 | Bross et al. |
| 2005/0054381 A1 | 3/2005 | Lee |
| 2005/0060174 A1 | 3/2005 | Heyward et al. |
| 2005/0144072 A1 | 6/2005 | Perkowski |
| 2005/0160103 A1 | 7/2005 | Raffo |
| 2005/0210024 A1 | 9/2005 | Hursthiller |
| 2005/0246234 A1 | 11/2005 | Munyon |
| 2005/0278221 A1 | 12/2005 | Hahn-Carlson et al. |
| 2005/0289023 A1 | 12/2005 | Hahn-Carlson et al. |
| 2005/0289024 A1 | 12/2005 | Hahn-Carlson et al. |
| 2006/0085304 A1 | 4/2006 | Buarque De Macedo et al. |
| 2006/0085306 A1 | 4/2006 | Schulte et al. |
| 2006/0122918 A1 | 6/2006 | Graboske et al. |
| 2006/0155632 A1 | 7/2006 | Cherkas et al. |
| 2006/0178961 A1 * | 8/2006 | Stanley .................. G06Q 40/02 705/31 |
| 2006/0184410 A1 | 8/2006 | Ramamurthy |
| 2006/0206454 A1 | 9/2006 | Forstl et al. |
| 2006/0287890 A1 | 12/2006 | Stead |
| 2007/0033116 A1 | 2/2007 | Murray |
| 2007/0055571 A1 | 3/2007 | Fox |
| 2007/0061128 A1 | 3/2007 | Odom |
| 2007/0136115 A1 | 6/2007 | Senturk et al. |
| 2007/0250418 A1 | 10/2007 | Banks et al. |
| 2008/0027895 A1 | 1/2008 | Combaz |
| 2008/0027979 A1 | 1/2008 | Chandrasekar et al. |
| 2008/0059900 A1 | 3/2008 | Murray et al. |
| 2008/0065617 A1 | 3/2008 | Burke et al. |
| 2008/0104045 A1 | 5/2008 | Cohen |
| 2008/0119134 A1 | 5/2008 | Rao |
| 2008/0147494 A1 | 6/2008 | Larson |
| 2008/0189197 A1 | 8/2008 | Ianson et al. |

(56) References Cited

U.S. PATENT DOCUMENTS

| | | |
|---|---|---|
| 2008/0189757 A1 | 8/2008 | Schackow et al. |
| 2008/0196098 A1 | 8/2008 | Cottrell |
| 2008/0201206 A1 | 8/2008 | Pokorney |
| 2008/0263643 A1 | 10/2008 | Jaiswal |
| 2008/0288304 A1 | 11/2008 | Nores |
| 2009/0012884 A1 | 1/2009 | Harman et al. |
| 2009/0031042 A1 | 1/2009 | Phatak |
| 2009/0076335 A1 | 3/2009 | Schwarzberg et al. |
| 2009/0099959 A1 | 4/2009 | Liao |
| 2009/0234684 A1 | 9/2009 | Stoke et al. |
| 2009/0276374 A1 | 11/2009 | Viner |
| 2009/0307159 A1 | 12/2009 | Pinckney et al. |
| 2010/0010849 A1 | 1/2010 | Hurd |
| 2010/0017348 A1 | 1/2010 | Pinckney et al. |
| 2010/0023934 A1 | 1/2010 | Sheehan et al. |
| 2010/0146523 A1 | 6/2010 | Brigaut et al. |
| 2010/0251305 A1 | 9/2010 | Kimble et al. |
| 2010/0262495 A1 | 10/2010 | Dumon et al. |
| 2010/0274606 A1 | 10/2010 | Fain et al. |
| 2010/0312724 A1 | 12/2010 | Pinckney et al. |
| 2010/0332362 A1 | 12/2010 | Ramsey et al. |
| 2011/0004537 A1 | 1/2011 | Ianson et al. |
| 2011/0022502 A1 | 1/2011 | Evans |
| 2011/0066602 A1 | 3/2011 | Studer |
| 2011/0078066 A1 | 3/2011 | Sherman et al. |
| 2011/0119264 A1 | 5/2011 | Hu et al. |
| 2011/0137776 A1 | 6/2011 | Goad et al. |
| 2011/0173222 A1 | 7/2011 | Sayal |
| 2011/0258195 A1 | 10/2011 | Welling et al. |
| 2011/0264569 A1 | 10/2011 | Houseworth et al. |
| 2011/0264570 A1 | 10/2011 | Houseworth |
| 2012/0030159 A1 | 2/2012 | Pilaszy et al. |
| 2012/0030767 A1 | 2/2012 | Rippert, Jr. |
| 2012/0053965 A1 | 3/2012 | Hellman et al. |
| 2012/0084185 A1 | 4/2012 | Ciaramitaro et al. |
| 2012/0109792 A1 | 5/2012 | Eftekhari et al. |
| 2012/0136764 A1 | 5/2012 | Miller et al. |
| 2012/0211561 A1 | 8/2012 | Lieberman et al. |
| 2012/0215669 A1 | 8/2012 | Lieberman et al. |
| 2012/0278179 A1 | 11/2012 | Ray et al. |
| 2012/0303495 A1 | 11/2012 | Murray |
| 2012/0324393 A1 | 12/2012 | Mbenkum |
| 2013/0080302 A1 | 3/2013 | Ianson et al. |
| 2013/0091050 A1 | 4/2013 | Merrill |
| 2013/0124644 A1 | 5/2013 | Hunt et al. |
| 2013/0198047 A1 | 8/2013 | Houseworth et al. |
| 2013/0198287 A1 | 8/2013 | Raz |
| 2013/0254151 A1 | 9/2013 | Mohagheghi et al. |
| 2013/0282539 A1 | 10/2013 | Murray |
| 2013/0282733 A1 | 10/2013 | Tawakol |
| 2013/0290200 A1 | 10/2013 | Singh |
| 2014/0027509 A1 | 1/2014 | Lieberman et al. |
| 2014/0032259 A1 | 1/2014 | LaFever |
| 2014/0068413 A1 | 3/2014 | Christensen |
| 2014/0101571 A1 | 4/2014 | Lewis |
| 2014/0114822 A1 | 4/2014 | Sharma |
| 2014/0156566 A1 | 6/2014 | Kabiljo et al. |
| 2014/0172656 A1 | 6/2014 | Shaw |
| 2014/0180883 A1 | 6/2014 | Regan |
| 2014/0201045 A1 | 7/2014 | Pai et al. |
| 2014/0201108 A1 | 7/2014 | Chapman |
| 2014/0214636 A1 | 7/2014 | Rajsky |
| 2014/0222702 A1 | 8/2014 | Jennings |
| 2014/0244455 A1 | 8/2014 | Huang et al. |
| 2014/0244456 A1 | 8/2014 | Huang et al. |
| 2014/0248063 A1 | 9/2014 | Chourasia |
| 2014/0279190 A1 | 9/2014 | Severinghaus et al. |
| 2014/0314225 A1 | 10/2014 | Riahi et al. |
| 2014/0324648 A1 | 10/2014 | Mori et al. |
| 2014/0325664 A1 | 10/2014 | Nekhoroshev |
| 2014/0337189 A1 | 11/2014 | Barsade et al. |
| 2014/0337753 A1 | 11/2014 | McKellar et al. |
| 2015/0007065 A1 | 1/2015 | Krishnamoorthy |
| 2015/0026146 A1 | 1/2015 | Mance |
| 2015/0081470 A1 | 3/2015 | Westphal |
| 2015/0101599 A1 | 4/2015 | Berry |
| 2015/0149877 A1 | 5/2015 | Ling, III |
| 2015/0178371 A1 | 6/2015 | Seth |
| 2015/0332167 A1 | 11/2015 | Kaush et al. |
| 2015/0363875 A1 | 12/2015 | Guerry |
| 2015/0379631 A1 | 12/2015 | Singh |
| 2016/0034853 A1 | 2/2016 | Wang |
| 2016/0180248 A1 | 2/2016 | Regan |
| 2016/0071112 A1 | 3/2016 | Unser |
| 2016/0078567 A1 | 3/2016 | Goldman et al. |
| 2016/0098804 A1 | 4/2016 | Mascaro et al. |
| 2016/0125552 A1 | 5/2016 | Pathak et al. |
| 2016/0148322 A1 | 5/2016 | Mascaro et al. |
| 2016/0180470 A1 | 6/2016 | Mascaro et al. |
| 2016/0217533 A1 | 7/2016 | Laaser |
| 2016/0217534 A1 | 7/2016 | Goldman et al. |
| 2016/0246762 A1 | 8/2016 | Eaton |
| 2016/0247239 A1 | 8/2016 | Houseworth et al. |
| 2016/0275627 A1 | 9/2016 | Wang et al. |
| 2016/0328804 A1 | 11/2016 | Mori et al. |
| 2016/0328805 A1 | 11/2016 | Mori et al. |
| 2016/0328806 A1 | 11/2016 | Mori et al. |
| 2017/0004585 A1 | 1/2017 | Dang et al. |
| 2017/0104841 A1 | 4/2017 | Duke |
| 2017/0132314 A1 | 5/2017 | Liu et al. |

FOREIGN PATENT DOCUMENTS

| | | |
|---|---|---|
| KR | 10-2013-0027811 | 3/2013 |
| WO | WO 2004/008367 | 1/2004 |

OTHER PUBLICATIONS

U.S. Appl. No. 14/871,366, filed Sep. 30, 2015 (Nov. 6, 2020 to Feb. 6, 2020).

U.S. Appl. No. 14/925,633, filed Oct. 28, 2015 (Nov. 6, 2020 to Feb. 6, 2020).

U.S. Appl. No. 15/363,681, filed Nov. 29, 2016.

U.S. Appl. No. 14/530,305, filed Oct. 31, 2014.

U.S. Appl. No. 14/530,369, filed Oct. 31, 2014.

U.S. Appl. No. 14/607,935, filed Jan. 28, 2015.

U.S. Appl. No. 12/475,767, filed Jun. 1, 2009.

U.S. Appl. No. 11/413,308, filed Apr. 28, 2006.

U.S. Appl. No. 14/674,582, filed Mar. 31, 2015.

U.S. Appl. No. 15/164,777, filed May 25, 2016.

U.S. Appl. No. 14/871,366, filed Sep. 30, 2015.

U.S. Appl. No. 14/925,633, filed Oct. 28, 2015.

U.S. Appl. No. 16/295,417, filed Mar. 7, 2019.

U.S. Appl. No. 16/524,825, filed Jul. 29, 2019.

U.S. Appl. No. 14/484,119, filed Sep. 11, 2014.

English Language Abstract of KR 10-2013-0027811 published Mar. 18, 2013.

English Language Abstract of KR 10-2009-0089225 published Aug. 21, 2009.

English Language Abstract of JP 2002-099613 published Apr. 5, 2002.

web.archive.org/web/20100919125845/http://cpaclass.conn/tax-accounting/tax-law/internal-revenue-code/26-usc-section/196.htnn, CPA, class, U.S. Tax Laws Internal Revenue Code, Sep. 19, 2010 (Year: 2010).

"Modular Programming," Wikipedia, the free encyclopedia, Jul. 29, 2014, http://en.wikipedia.org/w/index.php?title=Modular_programming &oldid=618953117, retrieved from the Internet on Mar. 31, 2015, 4 pages.

Anders, B. Susan; "Website of the Month: MSN Money Tax Center," Apr. 2013, The CPA Journal, pp. 72-73.

Forsati, R.; "Web Page Personalization Based on Weighted Association Rules," 2009 International Conference on Electronic Computer Technology, pp. 130-135.

http://en.wikipedia.org/wiki/Artificial_neural_network, printed Oct. 27, 2014 (22 pages).

http://en.wikipedia.org/wiki/Declarative_programming, printed Oct. 27, 2014 (4 pages).

(56) References Cited

OTHER PUBLICATIONS http://en.wikipedia.org/wiki/Generalized_linear_model, printed Oct. 27, 2014 (13 pages).
http://en.wikipedia.org/wiki/Gradient_boosting, printed Oct. 27, 2014 (8 pages).
http://en.wikipedia.org/wiki/Imperative_programming, printed Oct. 27, 2014 (4 pages).
http://en.wikipedia.org/wiki/K-d_tree, printed Oct. 27, 2014 (10 pages).
http://en.wikipedia.org/wiki/K-nearest_neighbors_algorithm, printed Oct. 27, 2014 (10 pages).
http://en.wikipedia.org/wiki/Logistic_regression, printed Oct. 27, 2014 (28 pages).
http://en.wikipedia.org/wiki/Naive_Bayes_classifier, printed Oct. 27, 2014 (14 pages).
http://en.wikipedia.org/wiki/Predictive_analytics, printed Oct. 27, 2014 (18 pages).
http://en.wikipedia.org/wiki/Predictive_modelling, printed Oct. 27, 2014 (8 pages).
http://en.wikipedia.org/wiki/Random_forest, printed Oct. 27, 2014 (7 pages).
http://en.wikipedia.org/wiki/Support_vector_machine, printed Oct. 27, 2014 (16 pages).
http://www.forbes.com/sites/danwoods/2013/04/171why-adopting-the-declarative-programming-practices-will-improve-your-return-from-technology/, printed Oct. 27, 2014 (8 pages).
http://www.gartner.com/it-glossary/predictive-modeling, printed Oct. 27, 2014 (1 page).
http://www.ibm.com/developerworks/library/ba-predictive-analytics2/, printed Oct. 27, 2014 (8 pages).
PCT International Search Report for PCT/US2014/056516 dated Jun. 18, 2015 (3 pages).
PCT Written Opinion of the International Search Authority for PCT/US2014/056516 dated Jun. 18, 2015 (9 pages).
Publication 559: Final Income Tax Return for Decedent—Form 1040, p. 2, paragraph 2; https://taxmap.ntis.gov/taxmap/pub/p559-001.htm; retrieved from the Internet Jul. 11, 2017.
Zhang, Zhenya, et al.; "Enabling Personalization Recommendation with Weighted FP for Text Information Retrieval Based on User-Focus," Proceedings of the International Conference on Information Technology: Coding and Computing (ITCC'04), (5 pages).
"QuickBooks® Assessing the Health of the Data File and Trouble-shooting", The Sleeter Group, Aug. 2005 (71 pages).
U.S. Appl. No. 14/698,645, filed Apr. 28, 2015.
U.S. Appl. No. 15/363,681, filed Nov. 29, 2016 (Feb. 6, 2020 to present).
U.S. Appl. No. 14/925,633, filed Oct. 28, 2015 (Feb. 6, 2020 to present).
U.S. Appl. No. 14/484,119, filed Sep. 11, 2014 (Mar. 15, 2020 to present).

* cited by examiner

SYSTEMS FOR ALLOCATING RESOURCES BASED ON ELECTRONIC TAX RETURN PREPARATION PROGRAM USER CHARACTERISTICS

This application includes subject matter similar to the subject matter described in the following co-owned applications: U.S. application Ser. No. 14/484,119, filed Sep. 11, 2014, entitled "Methods System and Articles of Manufacture for Using a Predictive Model to Determine Tax Topics Which are Relevant to a Taxpayer in Preparing an Electronic Tax Return"; U.S. application Ser. No. 14/530,305, filed Oct. 31, 2014, now U.S. Pat. No. 10,013,721, issued Jul. 3, 2018, entitled "Identification of Electronic Tax Return Errors Based on Declarative Constraints"; U.S. application Ser. No. 14/530,369, filed Oct. 31, 2014, entitled "Predictive Model Based Identification of Potential Errors in Electronic Tax Return"; U.S. application Ser. No. 14/674,582, filed Mar. 31, 2015, entitled "Methods, Systems and Computer Program Products for Calculating an Estimated Result of a Tax Return"; U.S. application Ser. No. 14/607,935, filed Jan. 28, 2015, entitled "Methods and Systems for Identifying Product Defects Within a Tax Return Preparation System"; and U.S. application Ser. No. 14/698,645, filed Apr. 28, 2015, entitled "Systems for Identifying Abandonment Indicators for an Electronic Tax Return Preparation Program." The contents of which are fully incorporated herein by reference.

SUMMARY

Embodiments are directed to computer analytic systems for allocating resources of an electronic tax return preparation program.

In one embodiment directed to a computer analytic system for allocating resources of an electronic tax return preparation system, the system includes an information module configured to collect taxpayer data of a user, where the taxpayer data includes an indicator of an increased likelihood that the user will abandon the electronic tax return preparation program ("abandonment indicator"). The system also includes a memory module configured to store the collected taxpayer data. The system further includes a retention module configured to analyze the collected taxpayer data and generate a resource allocation recommendation based on the collected taxpayer data.

In a single or multiple embodiments, the taxpayer data also includes data selected from the group consisting of taxpayer information entered by the user, taxpayer information relating to the taxpayer obtained from one or more third parties, actions taken by the user in the electronic tax return preparation program, and whether the user has completed an electronic tax return using the electronic tax return preparation program or abandoned the electronic tax return preparation program.

In a single or multiple embodiments, the retention module includes a workflow location tracker. In those embodiments, analyzing the collected taxpayer data includes the workflow location tracker identifying the last location in a workflow of the electronic tax return preparation program occupied by the user before the user abandoned the electronic tax return preparation program. In those embodiments, the resource allocation recommendation includes offering to the user an additional resource related to the identified last location occupied by the user.

In a single or multiple embodiments, the retention module includes a workflow activity history tracker. In those embodiments, analyzing the collected taxpayer data includes the workflow activity history tracker identifying a workflow activity history of the user before the user abandoned the electronic tax return preparation program. In those embodiments, the resource allocation recommendation includes offering the user an additional resource related to the workflow activity history of the user.

In a single or multiple embodiments, the retention module includes a taxpayer characteristic identifier. In those embodiments, analyzing the collected taxpayer data includes the taxpayer characteristic identifier determining a correlation between a taxpayer characteristic and the indicator. In those embodiments, the resource allocation recommendation includes offering the user an additional resource related to the taxpayer characteristic. Determining a correlation may include the taxpayer characteristic identifier analyzing the indicator. Analyzing the collected taxpayer data may also include the taxpayer characteristic identifier determining a correlation between a plurality of taxpayer characteristics and the indicator. In those embodiments, the resource allocation recommendation includes offering the user one or more additional resources related to the plurality of taxpayer characteristics.

In a single or multiple embodiments, the retention module includes a retention sub-module. In those embodiments, analyzing the collected taxpayer data includes the retention sub-module identifying a user characteristic shared by users who completed an electronic tax return using the electronic tax return preparation program or abandoned the electronic tax return preparation program. In those embodiments, the resource allocation recommendation includes offering the user an additional resource related to the user characteristic.

In a single or multiple embodiments, the retention module includes a plurality of retention sub-modules. In those embodiments, analyzing the collected taxpayer data includes the plurality of retention sub-modules identifying a plurality of user characteristics shared by users who completed an electronic tax return using the electronic tax return preparation program or abandoned the electronic tax return preparation program. In those embodiments, the resource allocation recommendation includes offering the user an additional resource related to the user characteristics. The retention sub-module and/or the plurality of retention sub-modules may be selected from the group consisting of a clustering module, a k-means clustering module, a support vector machine, a decision tree module, a Naïve Bayesian classifier, and a neural network.

In a single or multiple embodiments, the additional resource is a computer, human or financial resource.

In a single or multiple embodiments, the computer analytic system is configured to be activated after a predetermined number of taxpayers perform an action in the electronic tax return preparation program. Alternatively or additionally, the computer analytic system may be configured to be iteratively activated each time predetermined numbers of taxpayers perform an action in the electronic tax return preparation program. In those embodiments, a predetermined number for a first iteration may be different from a predetermined number for a second iteration. The action may be selected from the group consisting of activate the electronic tax return preparation program, perform an action in the electronic tax return preparation program, and abandon the electronic tax return preparation program.

In a single or multiple embodiments, the computer analytic system is configured to be activated each time a taxpayer abandons the electronic tax return preparation program. Alternatively or additionally, the computer analytic system may be configured to be activated after a predetermined time. Further, alternatively or additionally, the computer analytic system may be configured to be manually activated.

In a single or multiple embodiments, the indicator is a numerical indicator. Alternatively or additionally, the memory module may include a plurality of files, a table, or a database configured to store taxpayer information relating to a plurality of taxpayers, where the files, table and database are sortable by respective indicators.

BRIEF DESCRIPTION OF THE DRAWINGS

The foregoing and other aspects of embodiments are described in further detail with reference to the accompanying drawings, in which the same elements in different figures are referred to by common reference numerals, wherein.

Figure 1:
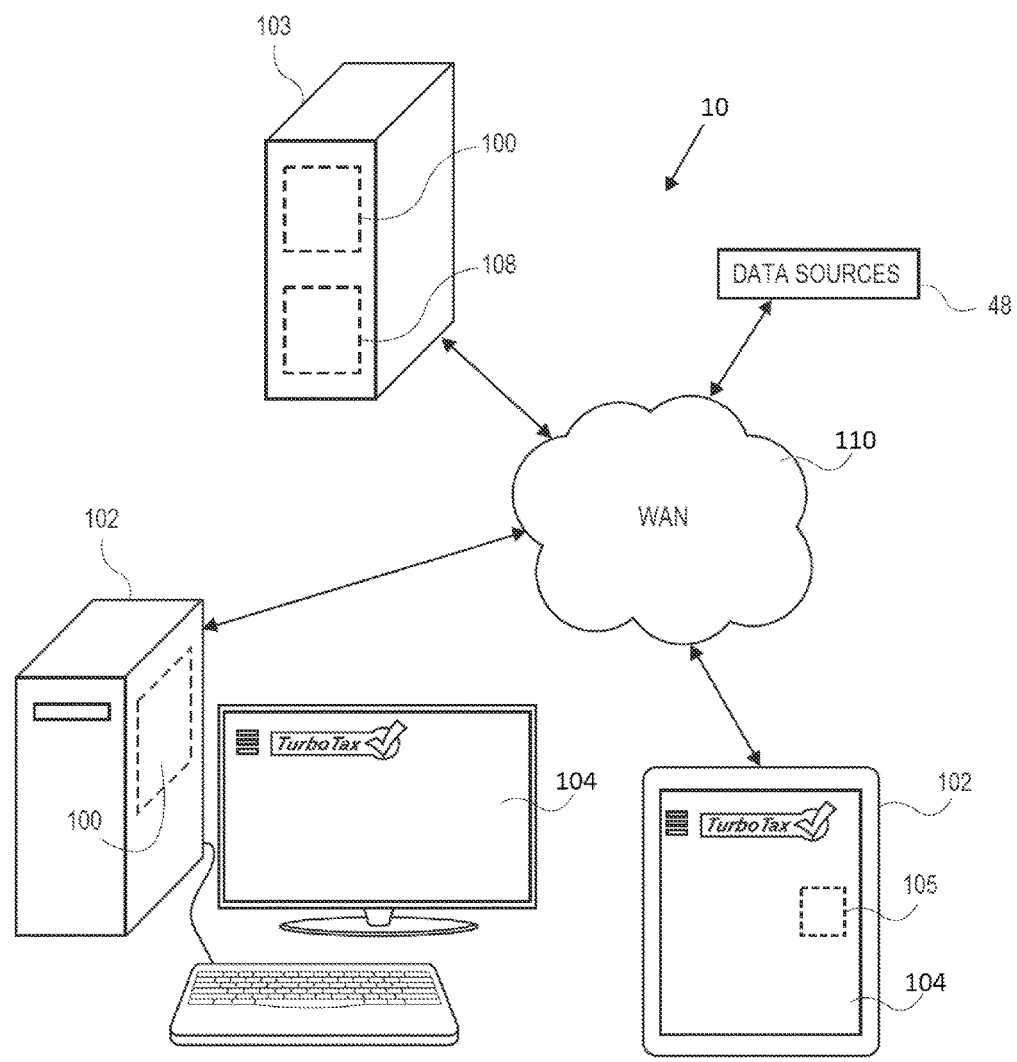
FIG. 1 is a schematic diagram illustrating the implementation of a computer analytic system and tax return preparation software on various computing devices according to one embodiment.

In order to better appreciate how to obtain the above-recited and other advantages and objects of various embodiments, a more detailed description of embodiments is provided with reference to the accompanying drawings. It should be noted that the drawings are not drawn to scale and that elements of similar structures or functions are represented by like reference numerals throughout. It will be understood that these drawings depict only certain illustrated embodiments and are not therefore to be considered limiting of scope of embodiments.

DETAILED DESCRIPTION OF ILLUSTRATED EMBODIMENTS

Like most consumer software, current electronic tax preparation programs present the same general user experience for all users. This results is an inefficient use of resources (e.g., computing, human and/or financial resources), because these programs do not take into account a particular user's particular characteristics and tailor at least portions of the user experience to user characteristics. Examples of user characteristics include, but are not limited to, likelihood of abandoning the electronic tax return preparation program, likelihood of completing an electronic tax return using the program, and likelihood of returning as a program user in the next tax year. The computer analytic systems described in this application are directed to providing more efficient use of electronic tax return preparation program resources by allocating system resources according to user characteristics.

For example, each tax year, millions of taxpayers start preparing their taxes using an electronic tax return preparation program only to abandon the tax-preparation process before completion. These cases of abandonment result in lost time for the taxpayers and lost users for the electronic tax return preparation program. The first step in addressing the abandonment problem is identifying characteristics/reasons/indicators that the users abandon the electronic tax return preparation program. The first step is addressed by U.S. application Ser. No. 14/698,645, filed Apr. 28, 2015, the contents of which have been previously incorporated by reference. The second step is to address those characteristics/reasons/indicators using the electronic tax return preparation program. The computer analytic systems described in this application are directed to the second step in addressing the abandonment problem by intelligent resource utilization tailored to user characteristics to reduce the likelihood that a particular user will abandon the application.

Embodiments described in this application are directed to computer analytic systems for allocating resources of an electronic tax return preparation program based on the characteristics of users thereof. In particular, the systems collect taxpayer data relating to a user of the electronic tax return preparation program, including one or more indicators of an increased likelihood that the user will abandon an electronic tax return preparation program ("abandonment indicator"). The computer analytic systems then analyze the collected taxpayer data and generate a resource allocation recommendation based on the collected taxpayer data.

The embodiments described herein address the program abandonment problem by providing differential treatment to users with an increased likelihood of abandonment. The differential treatment is tailored to the particular reason, indicator or user characteristic associated with an increased likelihood of abandonment to better address the reasons for abandonment.

In the described embodiments, many systems can be used to allocate resources of an electronic tax return preparation program based on user characteristics. For instance, in one embodiment, the abandonment indicator is that the user quit the program at the page most commonly associated with abandonment. Based on the indicator (and perhaps other taxpayer data), the computer analytic system may generate a resource allocation recommendation that the user be sent a message (e.g., email or SMS) offering additional assistance relating to the page, up to and including, help from a live user support associate. The indicator or other taxpayer information may have been provided by a retention module of the computer analytic system, other modules (e.g., an abandonment module) in the computer analytic system, an interview with the user upon quitting, or various other sources.

In one specific embodiment, the retention module of the computer analytic system includes a workflow location tracker, which determines the user's location in the workflow immediately prior to the user quitting (or abandoning) the program (i.e., "user's last location"). After the system collects taxpayer data including an abandonment indicator that the user has quit the program at the page most commonly associated with abandonment, the system analyzes the collected taxpayer data and the user's last location and generates a resource allocation recommendation as described above. Accordingly, the system may recommend that a user who quits the program at a problematic workflow location receive increased system resources related to the problematic workflow location, i.e. the user's last location.

As used in this application, a "user" or "taxpayer" includes, but is not limited to, a person preparing a tax return using tax return preparation software. The "user" or "taxpayer" may or may not be obligated to file the tax return. As used in this application, a "previous tax return" or "prior tax return" includes, but is not limited to, a tax return (in electronic or hard copy form) for a year before the current tax year. As used in this application, "tax data" includes, but is not limited to, information that may affect a user's income tax burden, including information typically included in a tax return. As used in this application, "taxpayer data" includes, but is not limited to, information relating to a taxpayer, including, but not limited to, tax data. The terms "tax data" and "taxpayer data," as used in this application, also include, but are not limited to, partially or fully completed tax forms (electronic and hard copy) that include information typically included in a tax return. As used in this application, "abandoning an electronic tax return preparation program" includes, but is not limited to: (1) deleting a taxpayer file/account on the program; (2) quitting the program without returning to the user file for a predetermined amount of time (e.g., 30 days) or before a tax filing deadline (e.g., April 15); or (3) quitting the program and filing taxes without using the program.

As used in this application, "computer," "computer device" and "computing device" include, but are not limited to, a computer (laptop or desktop) and a computer or computing device of a mobile communication device, smartphone and tablet computing device such as an IPAD (available from Apple Inc. of Cupertino, Calif.). As used in this application, "tax return preparation system," "tax return preparation computing device," "tax return preparation computer," "tax return preparation software," "tax return preparation module," "tax return preparation application," or "tax return preparation program" include, but are not limited to, one or more separate and independent components of a computer that must be added to a general purpose computer before the computer can prepare tax returns.

As used in this application, "information module" includes, but is not limited to, one or more separate and independent components of a computer that must be added to a general purpose computer before the computer can collection taxpayer data for analysis. As used in this application, "memory module" includes, but is not limited to, one or more separate and independent components of a computer that must be added to a general purpose computer before the computer can store taxpayer data in proper formats for analysis. As used in this application, "abandonment module" includes, but is not limited to, one or more separate and independent components of a computer that must be added to a general purpose computer before the computer can analyze taxpayer data and generate an abandonment indicator. As used in this application, "retention module" includes, but is not limited to, one or more separate and independent components of a computer that must be added to a general purpose computer before the computer can analyze taxpayer data and generate a resource allocation recommendation.

As used in this application, "tax logic agent" includes, but is not limited to, one or more separate and independent components of a computer that must be added to a general purpose computer before the computer can analyze tax data according to one or more sets of rules. As used in this application, "predictive model" includes, but is not limited to, one or more separate and independent components of a computer that must be added to a general purpose computer before the computer can generate resource allocation recommendations according to one or more algorithms. As used in this application, "tax calculation engine" includes, but is not limited to, one or more separate and independent components of a computer that must be added to a general purpose computer before the computer can perform tax calculations including, not limited to, calculating the results of electronic tax returns. As used in this application, "user interface controller" includes, but is not limited to, one or more separate and independent components of a computer that must be added to a general purpose computer before the computer can control a user interface.

FIG. 1 depicts an exemplary hardware system 10 on which a computer analytic system 108 according to one embodiment can be executed. The hardware system 10 according to this embodiment includes a plurality of tax preparation computing devices 102, a remote computing device 103, and one or more data sources 48 (described below), all connected via a network 110 (e.g., a WAN network). A plurality of users each physically interfaces with respective ones of the tax preparation computing devices 102. In some embodiments, a user can utilize an application 105 contained on a computing device 102 (i.e., a handheld communication/computing device) to communicate with a remote computing device 103 such as a server or the like. Tax return preparation software 100 may reside on the actual computing device 102 or, alternatively, the tax return preparation software 100 may reside on a remote computing device 103 as illustrated. The tax return preparation software 100 may also be accessed via conventional Internet browser software (not shown). Computer analytic system 108 may reside on the remote computing device 103 as illustrated. While the computer analytic system 108 depicted in FIG. 1 resides on the remote computing device 103 on which the tax return preparation software 100 also resides, in other embodiments the computer analytic system 108 may reside on one or more other computing devices connected to the hardware system 10. Communication between the computing device 102 and the remote computing device 103 may occur over a wide area network 110 such as the Internet. Communication may also occur over a private communication network 110 (e.g., a mobile phone network). The various computing devices 102, 103 may include visual displays or screens 104 operatively coupled thereto.

Figure 2:
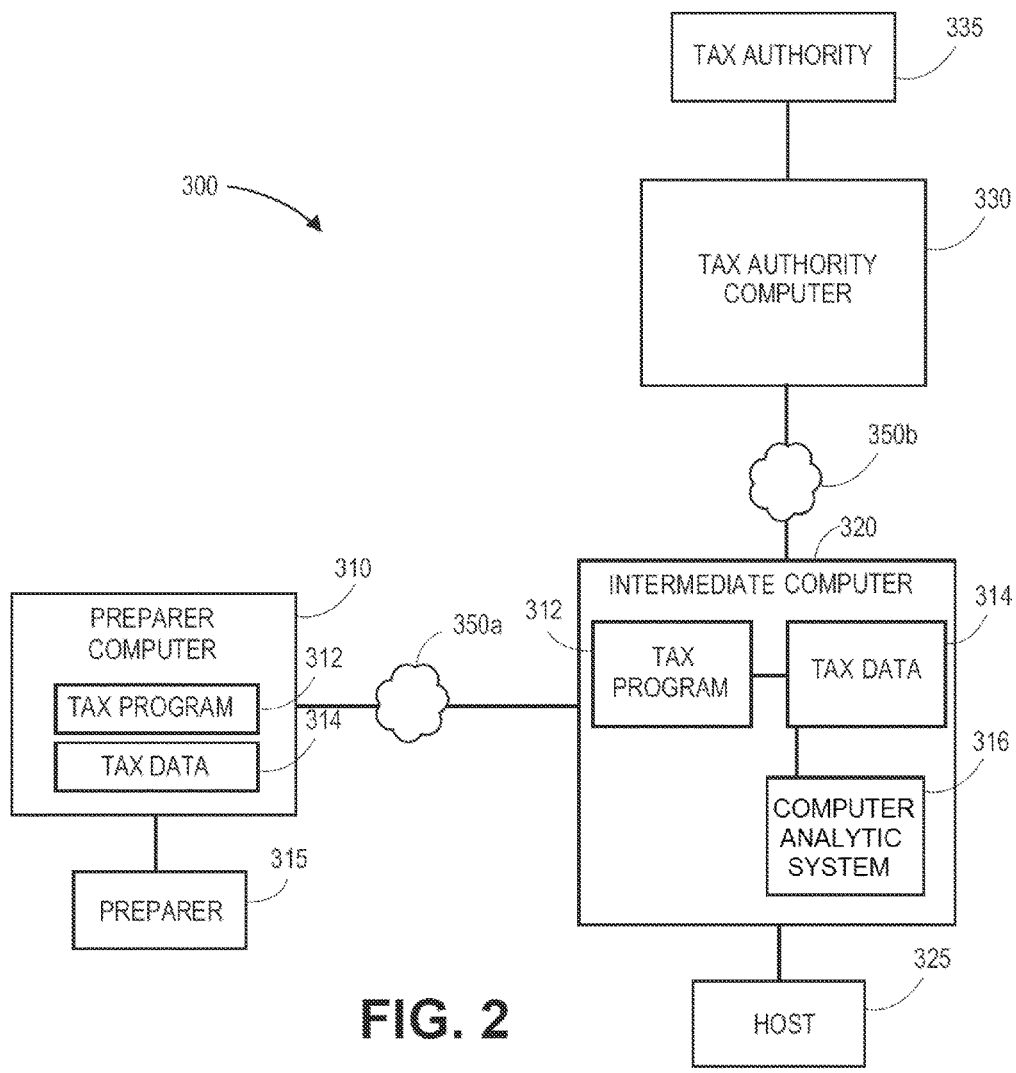
FIGS. 2 and 6 are block diagrams illustrating implementation of a computer analytic system and tax return preparation software on various computing devices according to two embodiments.

Referring to FIG. 2, according to another embodiment, a tax preparation system 300 including a computer analytic system 316 comprises or involves a first computing apparatus or computer 310 on which a tax return preparation program 312 (identified as "tax program" 312 in FIG. 2) executes to prepare an electronic tax return including taxpayer data 314 ("tax data" 314 in FIG. 2). Examples of tax preparation programs 312 that may be programmed to provide taxpayer data 314 to computer analytic systems 316 according to embodiments include desktop or online versions of TURBOTAX, PROSERIES and LACERTE tax return preparation applications, available from Intuit Inc.; H&R BLOCK tax return preparation application available from H&R Block, Inc.; and TAXACT tax return preparation application available from TaxAct, Inc. TURBOTAX, PROSERIES AND LACERTE are registered trademarks of Intuit Inc., Mountain View, Calif. H&R BLOCK is a registered trademark of HRB Innovations, Inc., Las Vegas, Nev. TAXACT is a registered trademark of TaxAct, Inc., Cedar Rapids, Iowa. However, computer analytic systems 316 according to the described embodiments are usable with all tax return preparation programs.

The tax preparation system 300 also includes or involves a special purpose intermediate computer 320 managed by a host 325. Intermediate computer 320 is specially or particularly configured or operable to host an on-line version of tax return preparation program 312 and to store taxpayer data 314. The intermediate computer 320 can also format and electronically file electronic tax returns with a computer 330 of a tax authority 335. Examples of a tax authority or other tax collecting entity include a federal tax authority, e.g., the Internal Revenue Service (IRS), a state tax authority or other tax collecting entity of the United States, a state thereof, or another country or state thereof (generally, "tax authority"). Examples of hosts 325 that provide the special purpose intermediate computer 320 include, for example, Intuit Inc., which provides a second or intermediate computer 320 or server of the Intuit Electronic Filing Center for electronically filing tax returns 312 and other hosts 325 that provide tax preparation programs 312 and electronic filing servers.

According to embodiments, intermediate computer 320 further comprises or accesses a computer analytic system, program or module 316 ("computer analytic system" in FIG. 2), configured to analyze taxpayer data 314 (including an abandonment indicator) and generate a resource allocation recommendation, as described below. FIG. 2 illustrates tax preparation program 312 and computer analytic system 316 as separate programs, but in other embodiments, the computer analytic system 316 may be a part or module of tax preparation program 312. Further, while FIG. 2 illustrates the tax preparation program 312 and the computer analytic system 316 as residing on the same intermediate computer 320, one or more of these system components may reside on a remote computer that is accessible by intermediate computer 320 through a network.

In the illustrated embodiment, tax return preparation program 312 is a local program that executes on preparer computer 310, but embodiments may also involve on-line tax preparation programs 312 hosted by intermediate computer 320 and accessed by preparer computer 310. For ease of explanation, reference is made generally to tax return preparation program 312.

For these and other communication purposes, preparer computer 310 is operably coupled to or in communication with second or intermediate computer 320 through a network 350a, and intermediate computer 320 is operably coupled to or in communication with tax authority computer 330 through a network 350b. Each of the networks 350a-b and other networks discussed herein (generally, network 350) may be different, or two or more networks 350 may be the same depending on the system configuration and communication protocols employed. One or more or all of networks 350 may be, for example, a wireless or cellular network, a Local Area Network (LAN) and/or a Wide Area Network (WAN). Reference to network 350 generally is not intended to refer to a specific network or communications protocol, and embodiments can be implemented using various networks 350 and combinations thereof.

Figure 3:
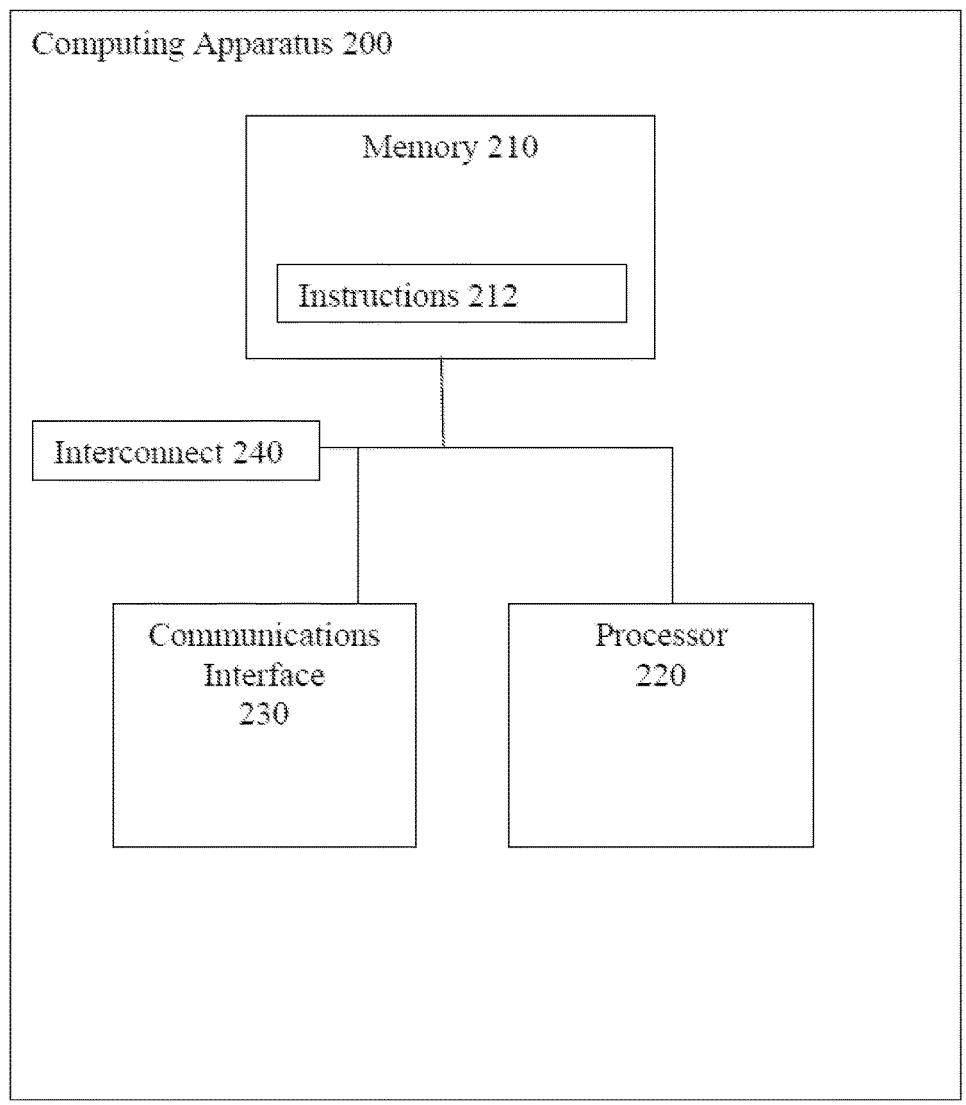
FIG. 3 is a block diagram of a computing apparatus or system in which various embodiments may be implemented or that may be utilized to execute various embodiments.

FIG. 3 generally illustrates certain components of a computing device 200 that may be utilized to execute embodiments and that includes a memory 210, program instructions 212, a processor or controller 220 to execute instructions 212, a network or communications interface 230, e.g., for communications with a network or interconnect 240 between such components. The memory 210 may be or include one or more of cache, RAM, ROM, SRAM, DRAM, RDRAM, EEPROM and other types of volatile or nonvolatile memory capable of storing data. The processor unit 220 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 240 may include a system bus, LDT, PCI, ISA, or other types of buses, and the communications or network interface may, for example, be an Ethernet interface, a Frame Relay interface, or other interface. The network interface 230 may be configured to enable a system component to communicate with other system components across a network which may be a wireless or various other networks. It should be noted that one or more components of computing device 200 may be located remotely and accessed via a network. Accordingly, the system configuration provided in FIG. 3 is provided to generally illustrate how embodiments may be configured and implemented. The processor units 220 in a tax preparation computing device 102, 103, a prepare computer 310, or an intermediate computer 320 are programmed with respective tax return preparation software 100 and tax program 312.

Figure 4:
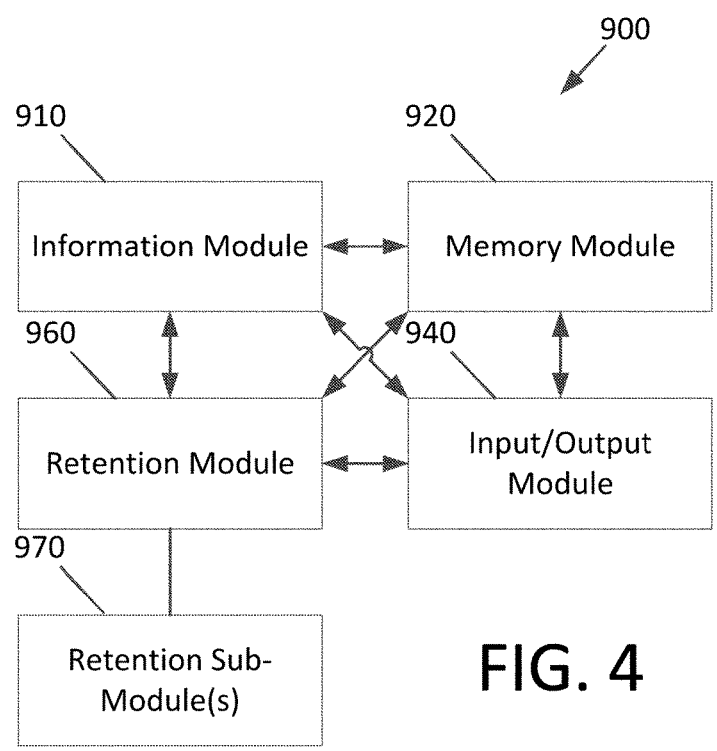
FIGS. 4 and 5 are block diagrams of computer analytic systems according to two embodiments.

FIG. 4 depicts a computer analytic system 900 according to one embodiment. The system 900 includes an information module 910, a memory module 920, a retention module 960 and an input/output module 940, which are operatively coupled to each other. The data collection module 910 is configured to collect taxpayer data of a plurality of taxpayers. The taxpayer data can be collected from a variety of sources, but always includes an indicator of an increased likelihood that a user will abandon an electronic tax return preparation program. Abandoning an electronic tax return preparation program means that a taxpayer quits the program (with or without saving the taxpayer's electronic tax return file) with no intention of returning.

The information module 910 typically collects taxpayer data from an electronic tax return preparation program. In one embodiment, the information module 910 is operatively coupled to the input/output module 940, and directs the input/output module 940 to collect the taxpayer data (e.g., from an electronic tax return preparation program). For these purposes, the information module 910 is configured to communicate with the electronic tax return preparation program to instruct the program regarding the types of information to retain. The taxpayer data can include, but is not limited to: (1) taxpayer information entered by the respective taxpayers (including data from prior years' tax returns); (2) taxpayer information relating to respective taxpayers obtained from third parties (e.g., data sources 48 from FIG. 1 such as forms W-2, 1099-INT and 1099-DIV, and US Census data); (3) actions taken by respective taxpayers in the electronic tax return preparation program (e.g., pages in an electronic tax return preparation program the taxpayer visited or questions asked by the taxpayer); and (4) whether the user has completed an electronic tax return using the program or abandoned the program.

The information module 910 is also configured to collect taxpayer information including an abandonment indicator. The taxpayer information also includes identifying information (e.g., social security number or name) to enable the computer analytic system 902 to issue resource allocation recommendations relating to the particular user. However, the other taxpayer information can be stored (e.g., for further system analysis) without the identifying information. This limitation would facilitate collection of taxpayer information from a larger cohort of taxpayers, due to privacy concerns. In a simple embodiment, the taxpayer information includes only an abandonment indicator and identifying information.

The memory module 920 is configured to store the collected taxpayer data. The memory module 920 may include a plurality of files, a table and/or a database configured to store taxpayer information relating to respective ones of the taxpayers. The files, table and/or database may be sortable by respective abandonment indicators.

The retention module 960 this configured to analyze the collected taxpayer data, including the abandonment indicator, using a variety of analysis tools and predictive models, as instantiated in retention sub-modules 970. The result of the analysis is to generate a resource allocation recommendation for the electronic tax return preparation program. In one embodiment, the retention module 960 sends the resource allocation recommendation to the electronic tax return preparation program, via the input/output module 940. In some embodiments, the tax return preparation program uses the resource allocation recommendation to direct reallocation of resources (e.g., computer, human and/or financial resources) to a particular user at increased risk of abandonment.

One example of a retention sub-module 970 is a workflow location tracker 950 that is configured to track a user's last workflow location immediately prior to the user quitting or abandoning the program, as described above. The retention module 960 analyzes the last workflow location of a user together with an abandonment indicator stating that the user has quit the program at the workflow location most commonly associated with abandonment. In one embodiment, if the most common abandonment location (e.g., 250,000 out of 5,000,000 users who abandoned the program) and last workflow location is a page for entering mortgage interest deduction, the retention module 960 may generate a resource allocation recommendation that the user (who quit the program at that page) receive additional resources relating to the mortgage interest deduction page in the workflow.

In one embodiment, the additional resource is a computer resource such as assignment to faster or less loaded servers, faster networks, servers with increased memory or additional processors. In another embodiment, the additional resource is a human resource such as access to a customer service representative, including a representative with specialized training related to the abandonment indicator (e.g., special guidance on how to proceed through the mortgage interest deduction page). In still another one, the additional resource is a financial resource such as a discount on the current tax filing or a coupon for a future discount.

Another example of a retention sub-module 970 is a workflow activity history tracker 950 that is configured to identify a user's workflow activity history. The workflow activity history can be a predetermined number of pages (e.g., 10 pages) accessed by a user before quitting or abandoning the electronic tax return preparation program. The retention module 960 analyzes the workflow activity history of a user together with an abandonment indicator stating that the user is becoming frustrated with the program and may abandon the program to call a human tax preparer. This abandonment indicator may be generated from an analysis of the workflow activity history of the user (e.g., a series of questions relating to a particular tax topic). The analysis is similar to the analysis described above with respect to the last workflow location. In response, the analysis, the retention module 960 may generate a resource allocation recommendation that the user (with the above-described workflow activity history) receive additional resources (computer, human and/or financial) relating to the particular tax topic.

Still another example of a retention sub-module 970 is a taxpayer characteristic identifier 970 that is configured to determining a correlation between a taxpayer characteristic and an abandonment indicator. In one embodiment, the taxpayer characteristic identifier 970 can determine that the user is price-sensitive, and the abandonment indicator states that price-sensitive users are more likely to abandon the program. In response, the retention module 960 can generate a resource allocation recommendation that the user receive additional financial resources (e.g., a filing fee discount).

In another embodiment, the taxpayer characteristic identifier 970 can determine that the user will have a reduction in deductions and/or credits compared to last year, and the abandonment indicator states that users with reductions in deductions and/or credits are more likely to abandon the program. In response, the retention module 960 can generate a resource allocation recommendation that the user receive additional human resources (e.g., access to a customer service representative with specialized training to identify deductions and credits).

In still another embodiment, the taxpayer characteristic identifier 970 can determine that the user is becoming frustrated with the response time of the program, and the abandonment indicator states that users with response time frustrations are more likely to abandon the program. In response, the retention module 960 can generate a resource allocation recommendation that the user receive additional computer resources (e.g., assignment to faster or less loaded servers, or faster networks).

In yet another embodiment, the taxpayer characteristic identifier 970 can determine that the user is a loyal customer for many years with an increasingly complicated tax situation. Further, the abandonment indicator states that users with increasingly complicated tax situations are more likely to abandon the program for a human accountant. In response, the retention module 960 can generate a resource allocation recommendation that the user receive additional computer resources (e.g., assignment to faster or less loaded servers, or faster networks for faster processing of complicated tax return), additional human resources (e.g., specialized advice on their specific tax situation and/or a human tax expert return review), and/or additional financial resources (special loyalty discounts).

In still another embodiment, the taxpayer characteristic identifier 970 can determine that the user files many returns using the program each tax year. Further, the abandonment indicator states that user is more likely to abandon the program. In response, the retention module 960 can generate a resource allocation recommendation that the user receive additional resources (e.g., computer, human or financial). In some embodiments, the amount of additional resources recommended for such a user may be greater than the amount of additional resources recommended for a user who files a single return each tax year.

Other examples of retention sub-modules 970 are predictive engines 970, including, but not limited to, clustering modules (e.g., k-means clustering modules), support vector machines, decision tree modules, Naïve Bayesian classifiers, and neural networks. Individual ones or groups of these predictive engines 970 can be used to identify taxpayer characteristics correlated/associated with abandonment indicators.

While retention modules 960 and sub-modules 970 have been described as configured to identify taxpayer characteristics correlated/associated with abandonment indicators, retention modules 960 and sub-modules 970 may also be configured to identify taxpayer characteristics correlated/associated with completing electronic tax returns using a specific electronic tax return preparation program. In those embodiments, the retention modules 960 generate resource allocation recommendations designed to encourage a user to adopt such "positive" characteristics.

The computer analytic system 900 depicted in FIG. 4 can be configured to self-activate in response to a variety of triggering events. In one embodiment, the triggering event is a predetermined number (e.g., 10,000 or 100,000) of taxpayers completing one or more actions in the electronic tax return preparation program. The action can be activating the electronic tax return preparation program, performing an action (e.g., filing) in the electronic tax return preparation program, and/or abandoning the electronic tax return preparation program.

The computer analytic system 900 can be configured to self-activate iteratively each time a predetermined number of taxpayers perform one or more actions to repeatedly analyze the growing set of taxpayer data using more accurate (i.e., closer to "the truth") and precise (i.e., more repeatable) abandonment indicators, which in turn facilitate more appropriate responsive actions to reduce abandonment of the program.

In one embodiment, the computer analytic system 900 can be configured to self-activate each time a taxpayer quits and/or abandons the electronic tax return preparation program. In an alternative embodiment, the computer analytic system 900 can be activated by a user (e.g., a system analyst).

Figure 5:
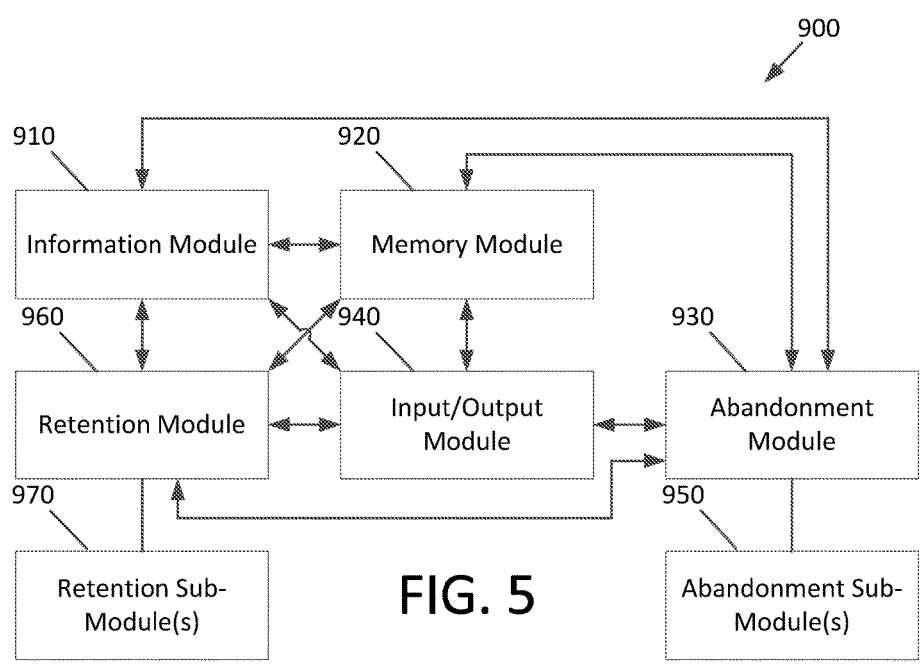

FIG. 5 depicts a computer analytic system 900 according to another embodiment. The system 900 depicted in FIG. 5 is very similar to the one depicted in FIG. 4, except that the system 900 depicted in FIG. 5 includes an abandonment module 930 configured to generate an abandonment indicator as described in U.S. application Ser. No. 14/698,645, filed Apr. 28, 2015, the contents of which have been previously incorporated by reference. Accordingly, the system 900 includes an information module 910, a memory module 920, an abandonment module 930, a retention module 960 and an input/output module 940, which are operatively coupled to each other.

Figure 6:
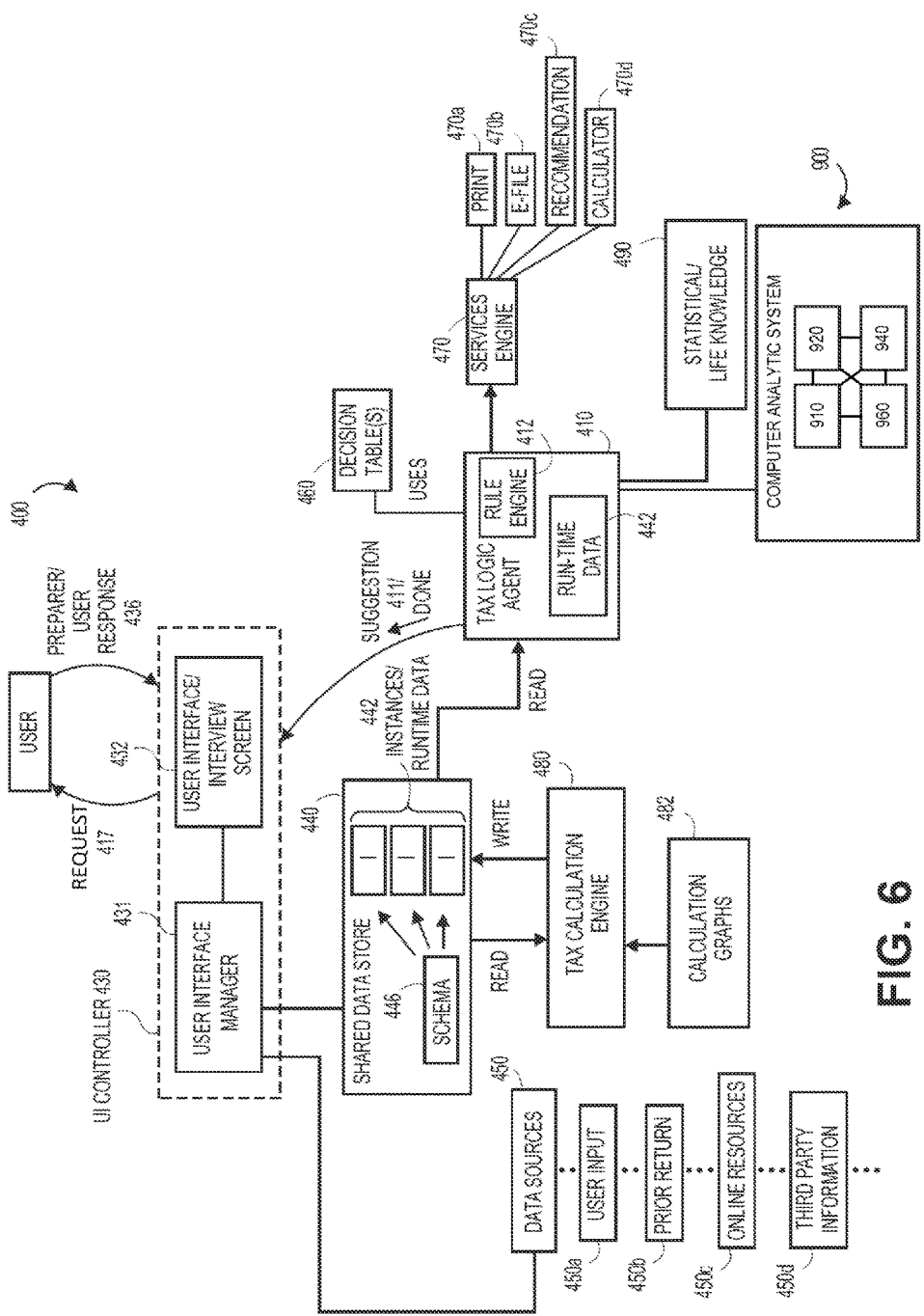

FIG. 6 is a detailed illustration of an electronic tax return preparation system 400 that is operatively coupled to a computer analytic system 900 according to one embodiment for generating resource allocation recommendations for electronic tax return preparation programs. While computer analytic systems 900 according to the embodiments are not limited to use with electronic tax return preparation systems using declarative programming, tax return preparation system 400 of the embodiment depicted in FIG. 6 is operable or configured to prepare electronic tax returns using rules and calculations based on a declarative data structures and declarative programming. While the computer analytic system 900 and electronic tax return preparation system 400 are depicted in FIG. 6 as separate systems, the computer analytic system 900 can be located in the tax return preparation system 400 in other embodiments.

As generally illustrated in FIG. 6, system 400 constructed according to one embodiment includes a tax logic agent ("TLA") 410 comprising or executing a rule engine or processor 412 that is used to scan or analyze decision tables 460 using runtime or instance data 442. TLA 410 operates in conjunction with shared data store 440 whereby updated tax data represented by instances 442 are read by TLA 410. Runtime data 442 read from shared data store 440 represents the instantiated representation of the canonical tax schema 446 at runtime. TLA 410 may contain therein a rule engine 412 that utilizes a fact cache and that generates either non-binding suggestions 411 for additional question(s) to present to a user or a "Done" instruction which indicates that completeness has occurred and additional input is not needed for a particular tax topic. Rule engine 412 may, in certain configurations, operate in the form a Drools expert engine. Other declarative rules engines 412 or rule engines that can process declarative data structures may also be utilized, and a Drools expert rule engine is provided as one of various examples that can be utilized in embodiments.

More specifically, during runtime, TLA 410 reads runtime 442 from data store 440, and a UI management module or controller 430 and a tax calculation engine 480 are also in communication with the data store 440. TLA 410 is operable to receive runtime or instance data 442 (generally, runtime data 442) that is based on a "dictionary" of terms of a data model or schema 446 (generally, schema 446). Schema 446 may specify, define or list tax-related concepts or terms, e.g., by names, type or category and hierarchy such as "name," "social security number," "citizenship," "address," "employer," "interest," "dividends," "mortgage," "deduction," "tax credit," "capital gain," etc. An instance 442 is instantiated or created for the collection of data received and for each term or topic of schema 446. Schema 446 may also specify data constraints such as a certain format of questions and answers (e.g., answer is binary (Y/N) or a number/value). It will be understood that the schema 446 may define hundreds or thousands of such concepts or terms and may be defined in various ways, one example is based on an Extensible Markup Language (XML) schema. Non-limiting examples of schemas 446 that may be utilized in embodiments include Modernized E-File (MeF) and MeF++ schemas. Further, it will be understood that embodiments may utilize various other schemas, and that these schemas are provided as a non-limiting example of schema 446 that can be utilized in embodiments.

With continuing reference to FIG. 6, runtime data 442 stored in shared data store 440 is used by TLA 410 or a separate population component that reads from shared data store 440 to populate corresponding fields of an electronic tax return or electronic tax form that is part of or used to prepare an electronic tax return and may be received from or based on data from various data sources 450a-d (generally, data source 450). Examples of data sources 450 include user input or manual entry of data into an interview screen generated by UI controller 430, data imported from a prior year electronic tax return, data from online resources (such as online social networks or other online resources) and third parties databases or resources (such as government databases or documents, such as property tax records, Department of Motor Vehicle (DMV) records, etc. TLA 410 reads runtime data 442 from shared data store 440 and utilizes or executes rules expressed in decision table 460 to determine, based on currently available runtime data 442, what other data or answers are still needed or, in other words, what conditions of a rule still need to be satisfied in order to reach a conclusion or completeness for the subject matter of decision table 460, and which questions or topics of decision table 460 should be presented to the user in order to obtain that other needed data to reach a conclusion. For example, a rule may specify that If X, and Y, and Z, then Conclusion.

Examples of tax data include data obtained from W-2 forms, data obtained from 1099-INT forms, data obtained from other investment income (INV), filing status, and number of dependents. Tax data can be derived from user inputs. That is to say the user (e.g., a taxpayer) will enter this information from a user interface as described herein. In other embodiments, however, tax data may be obtained from information that is automatically obtained by the tax preparation software. For example, in some embodiments, tax documents may be imaged or scanned with relevant data being automatically extracted using Object Character Recognition (OCR) techniques. In other embodiments, prior tax returns may be used by the tax preparation software to extract information (e.g., name, potential dependents, address, and social security number). Online resources such as financial services websites or other user-specific websites can be crawled and scanned to scrape or otherwise download tax data. Additional third party information sources such as credit bureaus, government databases, and the like can also be used by the tax preparation software to obtain tax data.

In still other embodiments, tax data may be derived or otherwise calculated. For example, while the number of dependents may be manually entered by a taxpayer, those dependent may not all be "qualifying" dependents for tax purposes. In such instances, the actual number of "qualified" dependents may be derived or calculated by the tax preparation software.

TLA 410 may also receive or otherwise incorporate information from statistical/life knowledge module 490. Statistical/life knowledge module 490 contains statistical or probabilistic data related to the current or other users of the tax return preparation application and/or other taxpayers. For example, statistical/life knowledge module 490 may indicate that taxpayers residing within a particular zip code are more likely to be homeowners than renters.

Data that is contained within statistic/life knowledge module 490 may be obtained by analyzing aggregate tax data of a large body of taxpayers. For example, entities having access to tax filings may be able to mine their own proprietary data to establish connections and links between various taxpayer characteristics and tax topics. This information may be contained in a database or other repository that is accessed by statistic/life knowledge module 490. This information may be periodically refreshed or updated to reflect the most up-to-date relationships. Generally, the data contained in statistic/life knowledge module 490 is not specific to a particular taxpayer but is rather generalized to characteristics shared across a number of taxpayers although in other embodiments, the data may be more specific to an individual taxpayer.

The system 400 also includes a UI controller 430. TLA 410 provides to UI controller 430 a non-binding suggestion 411 comprising a selected question or topic 461 to be addressed. In the illustrated embodiment, UI controller 430 includes a UI or user experience manager 431 that determines how to process non-binding suggestions 411 with selected questions or topics 461 and generates an interview screen 432 for the UI or selects an interview screen 432 of the UI based on the question or topic 461 of non-binding suggestion 411. UI controller 430 encompasses a UI manager 431 and a UI or screen presentation module 432 (presentation module). The presentation module 432 is controlled by the UI manager 431 and may manifest itself, typically, on a visual screen or display 104 on a computing device 102 utilized by the user of the tax return preparation application program 100. The computing device may include the display of a computer, laptop, tablet, mobile phone (e.g., Smartphone), or the like. Different user interface presentations 432 may be invoked depending, for example, on the type of display that is utilized by the computing device. For example, an interview screen with many questions or a significant amount of text may be appropriate for a computer, laptop, or tablet screen but such as presentation may be inappropriate for a mobile computing device such as a mobile phone or Smartphone. In this regard, different interface presentations may be prepared for different types of computing devices. The nature of the interface presentation 432 may not only be tied to a particular computing device but different users may be given different interface presentations 432. For example, a taxpayer that is over the age of 60 may be presented with an interview screen that has larger text or different visual cues than a younger user.

Typically, although not exclusively, in response to a user interface presentation 432 that is generated (e.g., interview screen), a user inputs data to the tax preparation software using an input device such as a mouse, finger tap, keyboard, stylus, voice entry, or the like to respond to questions. The user or taxpayer may also be asked not only to respond to questions but also to include dollar amounts, check or un-check boxes, select one or more options from a pull down menu, select radio buttons, or the like. Free form text entry may also be request of the user or taxpayer. For example, with regard to donated goods, user or taxpayer may be prompted to explain what the donated good are and describe the same in sufficient detail to satisfy requirements set by a particular taxing authority. New or updated data is then reflected in the updated instantiated representation of schema 446 and stored to shared data store 440, and this data may include a user response 436 to a taxpayer data request 417 that was generated and presented to user through an interview screen selected or generated by UI controller 430.

The system 400 also includes a tax calculation engine 480, which reads the current runtime data 442 from shared data store 440, and uses this data as inputs into respective nodes of one or more calculation graphs 482. Respective results or values are calculated with associated functions that are executed with the input data. New or resulting data is written back by tax calculation engine 480 to shared data store 440 for subsequent reading by the TLA 410. For example, if runtime data 442 received thus far includes wages and interest earned from two savings accounts, a function for calculating Adjusted Gross Income (AGI) would sum this wage and interest data, and the resulting AGI value (based on the runtime data received thus far) is written back to shared data store 440. As other types of AGI data are received or imported, tax calculation engine 480 will run calculation graphs 482 again to calculate a new AGI value, which would then be stored to shared data store 440.

TLA 410 outputs tax data that is used to generate the tax return (either electronic return or paper return). The return itself can be prepared by TLA 410 or at the direction of TLA 410 using, for example, a services engine 470 configured to perform a number of tasks or services for the taxpayer. For example, services engine 470 can include a printing option 4701*a*. Printing option 470*a* may be used to print a copy of a tax return, tax return data, summaries of tax data, reports, tax forms and schedules, and the like. Services engine 470 may also electronically file 470*b* or *e*-file a tax return with a tax authority (e.g., federal or state tax authority or other tax collecting entity). Whether a paper or electronic return is filed, data from shared data store 440 required for particular tax forms, schedules, and the like is transferred over into the desired format. With respect to e-filed tax returns, the tax return may be filed using the MeF web-based system that allows electronic filing of tax returns through the Internet. Of course, other e-filing systems may also be used other than those that rely on the MeF standard. Services engine 470 may also make one or more recommendations 470*c* based on the run-time data 442 contained in or read by TLA 410. For instance, services engine 470 may identify that a taxpayer has incurred penalties for underpayment of estimates taxes and may recommend to the taxpayer to increase his or her withholdings or estimated tax payments for the following tax year. As another example, services engine 470 may find that a person did not contribute to a retirement plan and may recommend 470*c* that taxpayer open an Individual Retirement Account (IRA) or look into contributions in an employer-sponsored retirement plan. Services engine 470 may also include a calculator 470*d* that can be used to calculate various intermediate calculations used as part of the overall tax calculation algorithm. For example, calculator 470*d* can isolate earned income, investment income, deductions, credits, and the like. Calculator 470*d* can also be used to estimate tax liability based on certain changed assumptions (e.g., how would my taxes change if I was married and filed a joint return?). Calculator 470*d* may also be used to compare analyze differences between tax years.

As shown in FIG. 6, the TLA 410 is operatively coupled to a computer analytic system 900, which is similar to the one depicted in FIG. 4. In this embodiment, the information module 910 of the computer analytic system 900 is configured to communicate with the TLA 410 through the input output module 940. The information module 910 can instruct the TLA 410 regarding the types of taxpayer information to collect and send to the memory module 920 of the computer analytic system 900. The taxpayer information may originate from various sources including, but not limited to, the shared data store 440, data sources 450 and/or the statistical/life knowledge module 490 of the tax return preparation system 400. Alternatively, the tax information may be the result of calculations performed by the tax calculation engine 480.

After the computer analytic system 900 has generated one or more resource allocation recommendations, the retention module 960 may send the resource allocation recommendations to the TLA 410. In response to the received abandonment indicators, the rule engine 412 in the TLA 410 may utilize a fact cache and generate non-binding suggestions 411 for additional user interface elements to present to a user based on the received resource allocation recommendations. The UI controller 430 may use its UI or user experience manager 431 to determine how to process non-binding suggestions 411.

Having described various aspects of computer analytic systems 900 according to various embodiments, computer-implemented methods for generating resource allocation recommendations using the computer analytic systems 900 will now be described.

Figure 7:
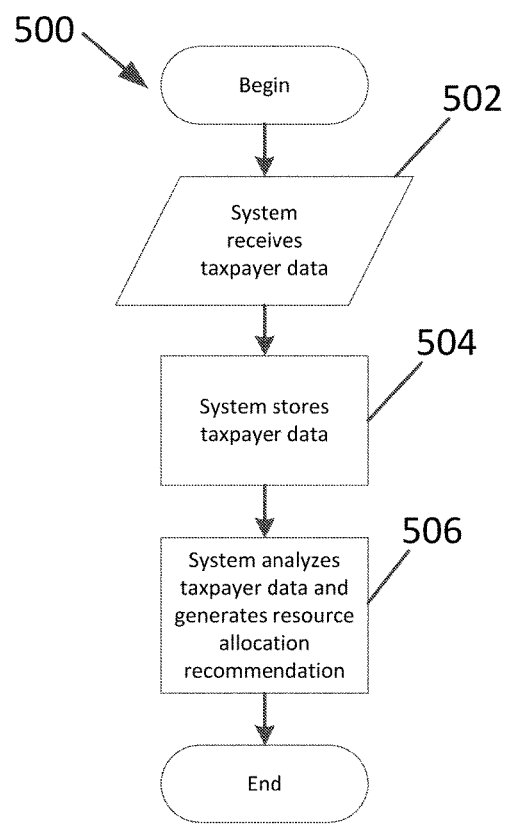
FIGS. 7 to 10 are flow charts depicting computer implemented methods of allocating resources of electronic tax return preparation systems according to various embodiments.

FIG. 7 depicts a computer-implemented method 500 executed according to one embodiment by a tax preparation computing device 102, 103 having tax return preparation system 400 operatively coupled to a computer analytic system 900. The tax return preparation system 400 and the computer analytic system 900 can run on the same computing device or on separate, but connected, computing devices. At step 502, the computer analytic system 900 receives taxpayer data (e.g., from the electronic tax return preparation system 400) relating to a user. As described above, the computer analytic system 900 may instruct a tax return preparation system 400 (e.g., the TLA 410 in FIG. 6) operatively coupled thereto to collect and send predetermined type/categories of taxpayer data. The taxpayer data includes an indicator of an increased likelihood that the user will abandon the electronic tax return preparation program.

At step 504, the computer analytic system 900 stores the received taxpayer data. As described above, the received taxpayer data may be stored as separate, taxpayer specific files, tables, and/or databases.

At step 506, the computer analytic system 900 analyzes the taxpayer data and the indicator to generate a resource allocation recommendation. As described above, the system 900 may analyze the taxpayer data using one or more of a workflow location tracker, a workflow activity history tracker, a taxpayer characteristic identifier, a clustering module, a support vector machine, a decision tree module, a Naïve Bayesian classifier, and/or a neural network.

Figure 8:
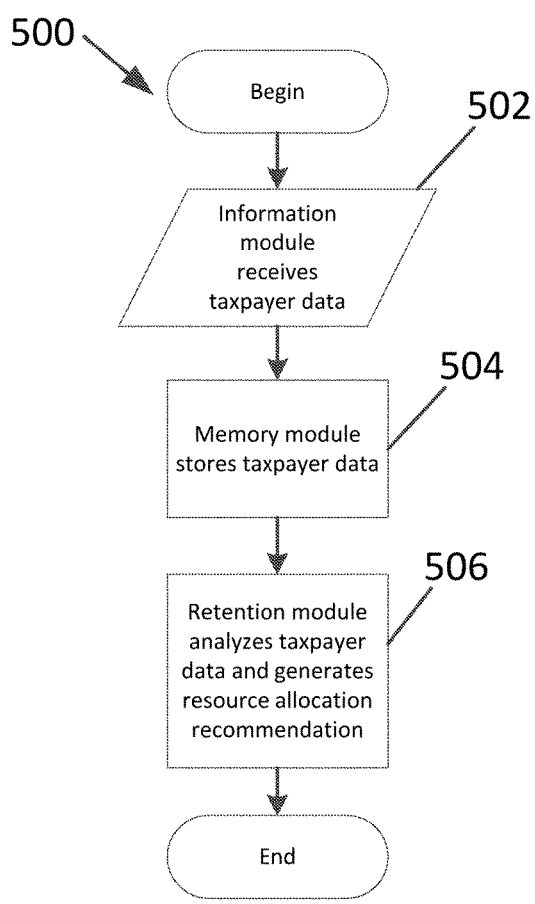

FIG. 8 depicts a computer-implemented method 500 executed according to another embodiment by a tax preparation computing device 102, 103 having tax return preparation system 400 operatively coupled to a computer analytic system 900. At step 502, an information module 910 the computer analytic system 900 receives taxpayer data (e.g., from the electronic tax return preparation system 400). At step 504, a memory module 920 of the computer analytic system 900 stores the received taxpayer data. At step 506, a retention module 960 the computer analytic system 900 analyzes the taxpayer data to identify one or more abandonment indicators. As described above, the retention module 960 may analyze the taxpayer data using one or more retention sub-modules 970 included therein. The retention sub-modules 970 include, but are not limited to, a workflow location tracker, a workflow activity history tracker, a taxpayer characteristic identifier, a clustering module, a support vector machine, a decision tree module, a Naïve Bayesian classifier, and/or a neural network.

Figure 9:
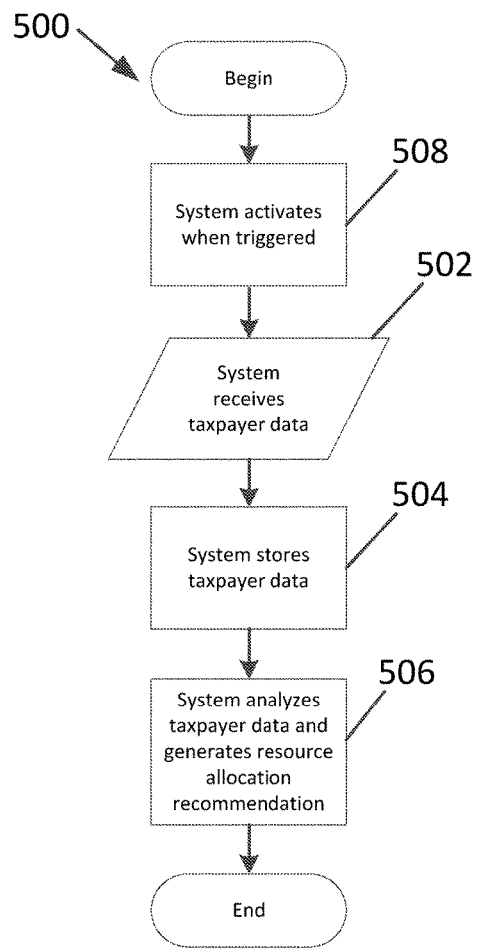

FIG. 9 depicts a computer-implemented method 500 executed according to still another embodiment by a tax preparation computing device 102, 103 having tax return preparation system 400 operatively coupled to a computer analytic system 900. The method 500 depicted in FIG. 9 is similar to the method 500 depicted in FIG. 7. However, the method 500 in FIG. 9 includes an additional step 508 before step 502 during which the computer analytic system 900 self-activates when it is triggered. As described above, the trigger can be a predetermined number (e.g., 10,000 or 100,000) of taxpayers completing one or more actions in the electronic tax return preparation program. The actions can be activating the electronic tax return preparation program, filing a tax return using the electronic tax return preparation program, and/or abandoning the electronic tax return preparation program. Steps 502, 504 and 506 of the method 500 in FIG. 9 are identical to the corresponding steps in the method 500 in FIG. 7.

Figure 10:
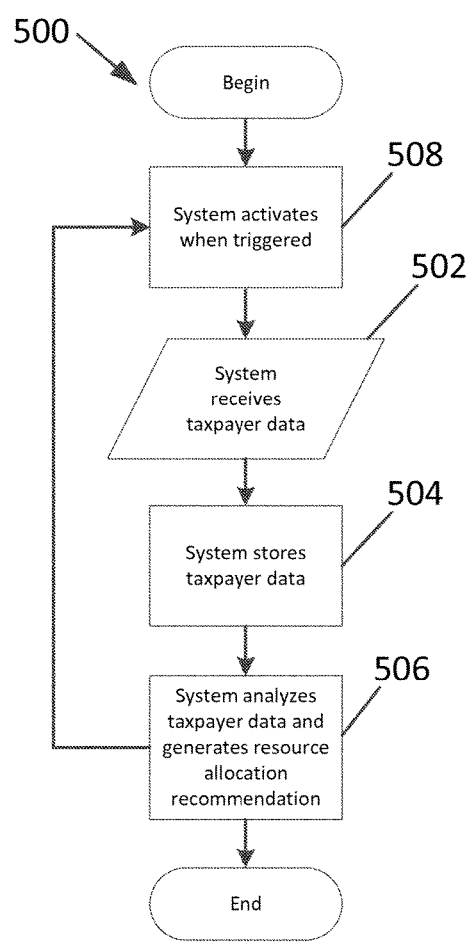

FIG. 10 depicts a computer-implemented method 500 executed according to yet another embodiment by a tax preparation computing device 102, 103 having tax return preparation system 400 operatively coupled to a computer analytic system 900. The method 500 depicted in FIG. 10 is similar to the method 500 depicted in FIG. 9. However, in the method 500 in FIG. 10, after the computer analytic system analyzes the taxpayer data in step 506, the computer analytic system can re-activate at step 508 when triggered again. Otherwise, steps 502, 504, 506 and 508 of the method 500 in FIG. 10 are identical to the corresponding steps in the method 500 in FIG. 9. Iteratively executing method 500 when triggered generates more accurate and precise abandonment indicators and resource allocation recommendations, which in turn facilitate more appropriate responsive actions to reduce abandonment of the program. Iterative analytics is especially useful when the electronic tax return preparation program has changed.

While certain embodiments have been described with reference to the electronic tax return preparation system 400 and computer analytic system 900 as illustrated in FIG. 6, in which the computer analytic system 900 communicates with the TLA 410, embodiments may also be implemented in traditional tax return preparation applications in which tax logic is hard coded within interview screens.

Additionally, while certain embodiments have been described with reference to taxpayer data as being data within fields of an electronic tax return that is being prepared (i.e., when an electronic tax return is abandoned), embodiments are not so limited. Other embodiments may involve utilizing data from at least one source other than the electronic tax return that includes at least one external input. For example, taxpayer data may be external data such as data of a prior year electronic tax return that was already filed, or other data that has been gathered or collected about the taxpayer, but not yet imported into an electronic tax return. Such data may include data collected from one or more external sources such as a financial management system utilized by the taxpayer (such as MINT or QUICKEN financial management systems), or from one or more other sources 450 shown in FIG. 6, such as an account the user has with an online social media website, third parties databases or resources (such as government databases or documents, such as property tax records, Department of Motor Vehicle (DMV) records and US Census data) and other external sources. MINT and QUICKEN are registered trademarks of Intuit Inc., Mountain View, Calif.

According to one embodiment, external data is utilized as taxpayer data if or when it is available. According to another embodiment, external data is used as taxpayer data only when it has been imported into an electronic tax return and confirmed by the taxpayer.

Further, while certain embodiments have been described with reference to generating resource allocation recommendations by execution of one or more predictive models, embodiments may utilize one or more of these predictive models at different times or simultaneously. For example, during the second iteration of computer analytic system, the system can execute one or more other predictive models compared to the first iteration. Moreover, while certain embodiments have been described with reference to generating resource allocation recommendations for electronic tax return preparation programs, other embodiments may involve generating resource allocation recommendations for any software.

Where methods and steps described above indicate certain events occurring in certain order, those of ordinary skill in the art having the benefit of this disclosure would recognize that the ordering of certain steps may be modified and that such modifications are in accordance with the variations of the disclosed embodiments. Additionally, certain of the steps may be performed concurrently in a parallel process as well as performed sequentially. Thus, the methods shown in various flow diagrams are not intended to be limited to a particular sequential order, unless otherwise stated or required.

Accordingly, embodiments are intended to exemplify alternatives, modifications, and equivalents that may fall within the scope of the claims.

What is claimed is:

1. A computer analytic system for allocating resources of an electronic tax return preparation system comprising instructions stored in a data store and executed by a processor of a first server, comprising:

an information module of the electronic tax return preparation system on the first server configured to collect taxpayer data of a user, wherein the taxpayer data includes an indicator of an increased likelihood that the user will abandon the electronic tax return preparation program;

a memory module of the electronic tax return preparation system on the first server operatively coupled to the information module, wherein the memory module is configured to store the collected taxpayer data;

a retention module of the electronic tax return preparation system on the first server operatively coupled to the information module and the memory module, wherein the retention module is configured to analyze the collected taxpayer data and generate a resource allocation recommendation based on the collected taxpayer data, wherein the resource allocation recommendation comprises the user being assigned to a second server, the second server being faster than the first server, wherein the computer analytic system is configured to be activated a first time after a first predetermined number of taxpayers perform an action in the electronic tax return preparation program, wherein the computer analytic system is configured to be activated a second time after a second predetermined numbers of taxpayers perform an action in the electronic tax return preparation program after the first time the computer analytic system is activated, and wherein the first predetermined number is different from the second predetermined number.

2. The computer analytic system of claim 1, wherein the taxpayer data also includes data selected from the group consisting of:

taxpayer information entered by the user;

taxpayer information relating to the taxpayer obtained from one or more third parties;

actions taken by the user in the electronic tax return preparation program; and whether the user has completed an electronic tax return using the electronic tax return preparation program or abandoned the electronic tax return preparation program.

3. The computer analytic system of claim 1, the retention module comprising a workflow location tracker, wherein analyzing the collected taxpayer data comprises the workflow location tracker identifying the last location in a workflow of the electronic tax return preparation program occupied by the user before the user abandoned the electronic tax return preparation program, and wherein the resource allocation recommendation further comprises offering to the user an additional resource related to the identified last location occupied by the user.

4. The computer analytic system of claim 3, wherein the additional resource is a computer, human or financial resource.

5. The computer analytic system of claim 1, the retention module comprising a workflow activity history tracker, wherein analyzing the collected taxpayer data comprises the workflow activity history tracker identifying a workflow activity history of the user before the user abandoned the electronic tax return preparation program, and wherein the resource allocation recommendation further comprises offering the user an additional resource related to the workflow activity history of the user.

6. The computer analytic system of claim 5, wherein the additional resource is a computer, human or financial resource.

7. The computer analytic system of claim 1, the retention module comprising a taxpayer characteristic identifier, wherein analyzing the collected taxpayer data comprises the taxpayer characteristic identifier determining a correlation between a taxpayer characteristic and the indicator, and wherein the resource allocation recommendation further comprises offering the user an additional resource related to the taxpayer characteristic.

8. The computer analytic system of claim 7, wherein the additional resource is a computer, human or financial resource.

9. The computer analytic system of claim 7, wherein determining a correlation comprises the taxpayer characteristic identifier analyzing the indicator.

10. The computer analytic system of claim 7, wherein analyzing the collected taxpayer data further comprises the taxpayer characteristic identifier determining a correlation between a plurality of taxpayer characteristics and the indicator,
wherein the resource allocation recommendation further comprises offering the user one or more additional resources related to the plurality of taxpayer characteristics.

11. The computer analytic system of claim 10, wherein the additional resource is a computer, human or financial resource.

12. The computer analytic system of claim 1, the retention module comprising a retention sub-module,
wherein analyzing the collected taxpayer data comprises the retention sub-module identifying a user characteristic shared by users who completed an electronic tax return using the electronic tax return preparation program or abandoned the electronic tax return preparation program, and
wherein the resource allocation recommendation further comprises offering the user an additional resource related to the user characteristic.

13. The computer analytic system of claim 12, wherein the retention sub-module is selected from the group consisting of a clustering module, a k-means clustering module, a support vector machine, a decision tree module, a Naïve Bayesian classifier, and a neural network.

14. The computer analytic system of claim 12, wherein the additional resource is a computer, human or financial resource.

15. The computer analytic system of claim 12, the retention module comprising a plurality of retention sub-modules,
wherein analyzing the collected taxpayer data comprises the plurality of retention sub-modules identifying a plurality of user characteristics shared by users who completed an electronic tax return using the electronic tax return preparation program or abandoned the electronic tax return preparation program, and
wherein the resource allocation recommendation further comprises offering the user an additional resource related to the user characteristics.

16. The computer analytic system of claim 15, wherein the plurality of retention sub-modules are selected from the group consisting of a clustering module, a k-means clustering module, a support vector machine, a decision tree module, a Naïve Bayesian classifier, and a neural network.

17. The computer analytic system of claim 15, wherein the additional resource is a computer, human or financial resource.

18. The computer analytic system of claim 1, wherein the action is selected from the group consisting of activate the electronic tax return preparation program, perform an action in the electronic tax return preparation program, and abandon the electronic tax return preparation program.

19. The computer analytic system of claim 1, wherein the computer analytic system is configured to be activated each time a taxpayer abandons the electronic tax return preparation program.

20. The computer analytic system of claim 1, wherein the computer analytic system is configured to be activated after a predetermined time.

21. The computer analytic system of claim 1, wherein the computer analytic system is configured to be manually activated.

22. The computer analytic system of claim 1, the memory module comprising a plurality of files, a table, or a database configured to store taxpayer information relating to a plurality of taxpayers, wherein the files, table and database are sortable by respective indicators.

23. The computer analytic system of claim 1,
wherein the electronic tax return preparation system communicates via a first network, and
wherein the resource allocation recommendation further comprises the user being assigned to a second network, the second network being faster than the first network.

* * * * *